(12) United States Patent
Zhou et al.

(10) Patent No.: US 10,705,104 B2
(45) Date of Patent: Jul. 7, 2020

(54) PRODUCTION-LINE-TYPE HIGH-THROUGHPUT SCREENING SYSTEM

(71) Applicant: Jiangnan University, Wuxi (CN)

(72) Inventors: Jingwen Zhou, Wuxi (CN); Jian Chen, Wuxi (CN); Jun Fang, Wuxi (CN); Meng Ning, Wuxi (CN); Guocheng Du, Wuxi (CN); Weizhu Zeng, Wuxi (CN); Qiuju Zhang, Wuxi (CN); Xiaomei Cao, Wuxi (CN)

(73) Assignee: Jiangnan University, Wuxi, Jiangsu (CN)

( * ) Notice: Subject to any disclaimer, the term of this patent is extended or adjusted under 35 U.S.C. 154(b) by 214 days.

(21) Appl. No.: 15/708,706

(22) Filed: Sep. 19, 2017

(65) Prior Publication Data

US 2019/0004076 A1    Jan. 3, 2019

(30) Foreign Application Priority Data

Jun. 30, 2017    (CN) .......................... 2017 1 0523892

(51) Int. Cl.
| | |
|---|---|
| *G01N 21/00* | (2006.01) |
| *G01N 35/02* | (2006.01) |
| *G01N 35/04* | (2006.01) |
| *G01N 35/00* | (2006.01) |
| *G01N 35/10* | (2006.01) |

(52) U.S. Cl.
CPC ....... *G01N 35/021* (2013.01); *G01N 35/0099* (2013.01); *G01N 35/028* (2013.01); *G01N 35/04* (2013.01); *G01N 35/1074* (2013.01); *G01N 2035/00158* (2013.01); *G01N 2035/00514* (2013.01); *G01N 2035/0422* (2013.01); *G01N 2035/0424* (2013.01)

(58) Field of Classification Search
CPC ....... G01N 35/0099; G01N 2035/0465; G01N 35/10
USPC ....................................................... 422/63, 65
See application file for complete search history.

(56) References Cited

U.S. PATENT DOCUMENTS

2003/0223916 A1* 12/2003 Testrut ...................... B01L 9/06
                                                              422/400

* cited by examiner

*Primary Examiner* — Natalia Levkovich
(74) *Attorney, Agent, or Firm* — IPro, PLLC

(57) ABSTRACT

The present invention provides a production-line-type high-throughput screening system, which relates to the field of biotechnology and testing equipment. The system comprises of four manipulators, three parallel conveyor belts with fixed slots, 2-DOF slipway and fixed fixtures, 96-channel pipetting system, coloring device, oscillating mixing device, microplate reader, well plates loading platform and well plates recycling platform. Manual operation takes five minutes to detect one 96-well plate, while this system can handle 20 96-well plates per minute. It expands the number of screening targets, making the screening process more clearly and concisely and liberating manual labor. The system makes effective contributions to the development of microbial breeding technology.

10 Claims, 6 Drawing Sheets

PRODUCTION-LINE-TYPE HIGH-THROUGHPUT SCREENING SYSTEM

CROSS-REFERENCES AND RELATED APPLICATIONS

This application claims the benefit of priority to Chinese Application No. 201710523892.7, entitled "A Production-line-type High-throughput Screening System", filed Jun. 30, 2017, which is herein incorporated by reference in its entirety.

BACKGROUND OF THE INVENTION

Field of the Invention

The present invention relates to the field of biotechnology and testing equipment, and more particularly relates to a production-line-type high-throughput screening system.

Description of the Related Art

The high-throughput screening technology refers to a new technique based on the molecular level and cell level experimental methods, using automatic systems, micro-plate carriers, sensitive detectors, and data processing and control software. High Throughput Screening allows a researcher to conduct millions of biochemical, genetic or pharmacological tests at the same time and to rapidly select out what he wants. In the context of the continuous development of microbial breeding technology, screening techniques determine the efficiency of hitting the target strains from a large pool of bacteria.

At present, domestic high-throughput screening system is mainly dependent on imported equipment. Sample transfer between the test devices still requires manual operation. There is still a need for manual search and matching between the final screening selection and the sample. There are usually tens of millions of samples need to be detected. The single operation step makes work tedious and the operators are prone to fatigue and error, which restricts the development of high-throughput screening to some extent. At present, most of China's microbial screening relies on imported equipment. Robots have not yet been used to implement automated high-throughput screening systems.

SUMMARY OF THE INVENTION

The invention is aimed at solving the main problems that the sample screening process of domestic high-throughput screening system is non-automatic and the number of the sample screening targets is enormously limited. It is necessary to provide a production-line-type high-throughput screening system based on conveyor belts.

Wherein said production-line-type high-throughput screening system, comprises of four manipulators, three parallel conveyor belts with fixed slots, 2-DOF slipway and fixed fixtures, the multi-channel pipette, the coloring device, the oscillating mixing device, the microplate reader, the well plate loading platform and the well plate recycling platform.

In one embodiment of the present invention, the production-line-type high-throughput screening system comprises of four manipulators, the well plate loading platform, conveyor belts with fixed slots, 2-DOF slipway, the coloring device, the oscillating mixing device, the microplate reader, the pipette head container recycling platform and deep-well plate recycling platform, shallow-well plate recycling platform. Wherein said conveyor belts with fixed slots include three parallel belts, the first conveyor belt for conveying pipette head container, the second conveyor belt for conveying 96-deep-well plate, the third conveyor belt for conveying the 96-shallow-well plate, respectively. Wherein said 2-DOF slipway stretches across the three parallel belts and the 96-channel pipette system is mounted on the 2-DOF slipway. Along the moving direction of the sample on the third conveyor belt, coloring device, oscillating mixing device and the microplate reader are arranged sequentially.

In one embodiment of the present invention, there are four manipulators. The first manipulator is used to carry the 96-shallow-well plate, the 96-deep-well plate and the pipette head container from the well plate loading platform to the corresponding conveyor belt. The second manipulator is used to carry the 96-shallow-well plate from the microplate reader to the shallow-well plate recycling platform. The third manipulator is used to carry the 96-deep-well plate and the empty pipette head container to the deep-well recycling platform and pipette head container recycling platform. The fourth manipulator is used to carry the 96-shallow-well plate from the conveyor belt to the oscillating mixing device.

In one embodiment of the present invention, the conveyor belts with the fixed slots have uniformly-spaced grooves for placing the 96-well plate and the pipette head container.

In one embodiment of the present invention, the coloring device is a 96-channal pipetting system, which is set on one side of the third conveyor belt to add developer to the 96-shallow-well plate which has already loaded samples.

In one embodiment of the present invention, the end of the manipulator is equipped with clamping device for holding the 96-well plate or pipette head container. The first connecting rod of the clamping device is driven directly by the motor and its ends are connected with the second connecting rod and the fourth connecting rod respectively by pin; and it is rotatable along the connecting part; the second connecting rod is connected with the third connecting rod by a pin and is rotatable along the connecting part; the fourth connecting rod is connected with the fifth connecting rod by a pin and is rotatable along the connecting part; the third connecting rod and the fifth connecting rod are respectively connected fixedly with the first chuck and the second chunk.

In one embodiment of the present invention, there are fixed fixtures installed on both sides of every conveyor belt under the 2-DOF slipway.

In one embodiment of the present invention, the manipulator is equipped with a visual sensor for automatically capturing the well plate on conveyor belts.

In one embodiment of the present invention, the production-line-type high-throughput screening system is equipped with sensors at every working position, used for detecting the presence and departure of well plate or pipette head container.

In one embodiment of the present invention, the 2-DOF slipway is equipped with a collision sensor.

In one embodiment of the present invention, the clamping device at the end of the manipulator is equipped with a pressure sensor.

The present invention is a combination of microbiology and mechanics. It promotes the automation of microbial high-throughput screening system for screening microorganisms with specific properties. The high-throughput screening system based on single manipulator can handle samples like microbial fermentation supernatant and microbial cell disruption. Manual operation takes five minutes to detect one 96-well plate, while this system can handle 20 96-well plates per minute which shows a great improvement in efficiency. The production-line-type microbial high-throughput screening system can expand the number of screening targets, make the screening process more clearly and concisely and liberate manual labor. The system makes effective contributions to the development of microbial breeding technology, thus further promoting the development of microbiology.

Figure 1A:
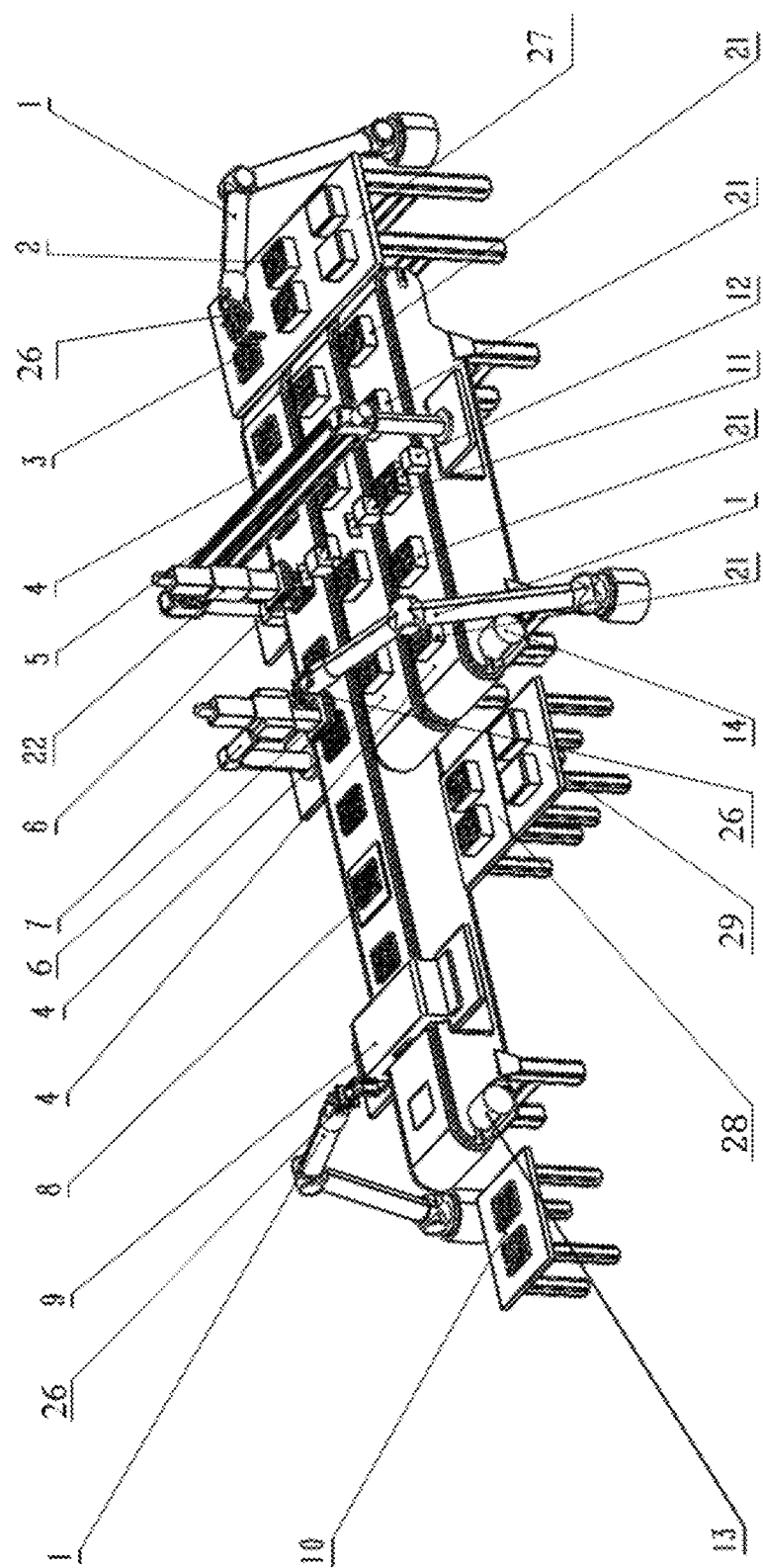
FIG. 1A is a diagram illustrating the general structure in a preferred embodiment.
Figure 1B:
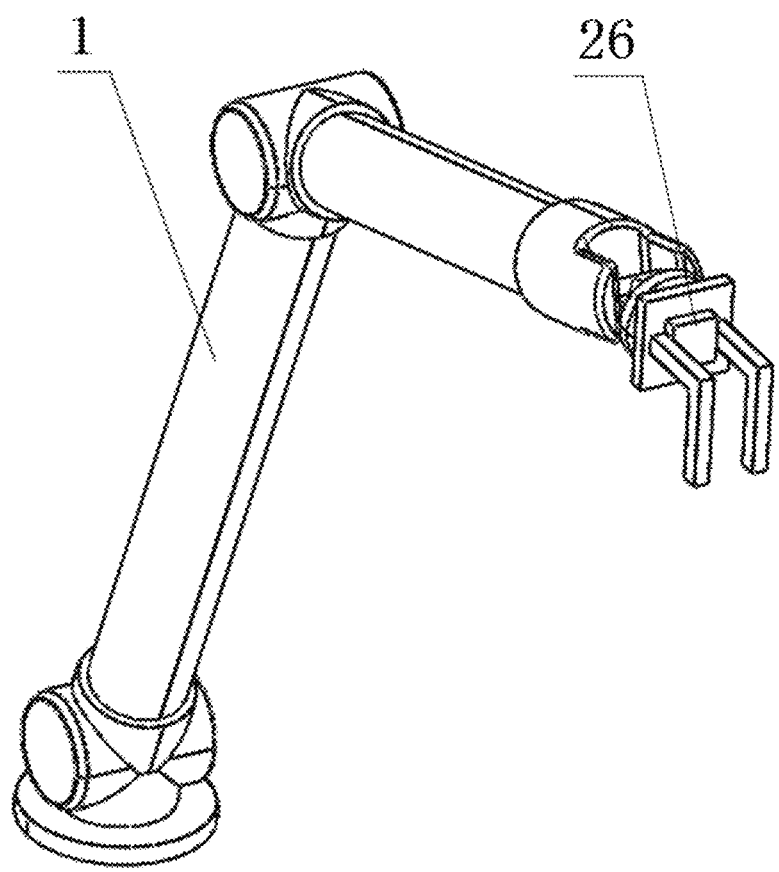
FIGS. 1B-1D are enlarged view corresponding to parts shown in FIG. 1A.
Figure 1C:
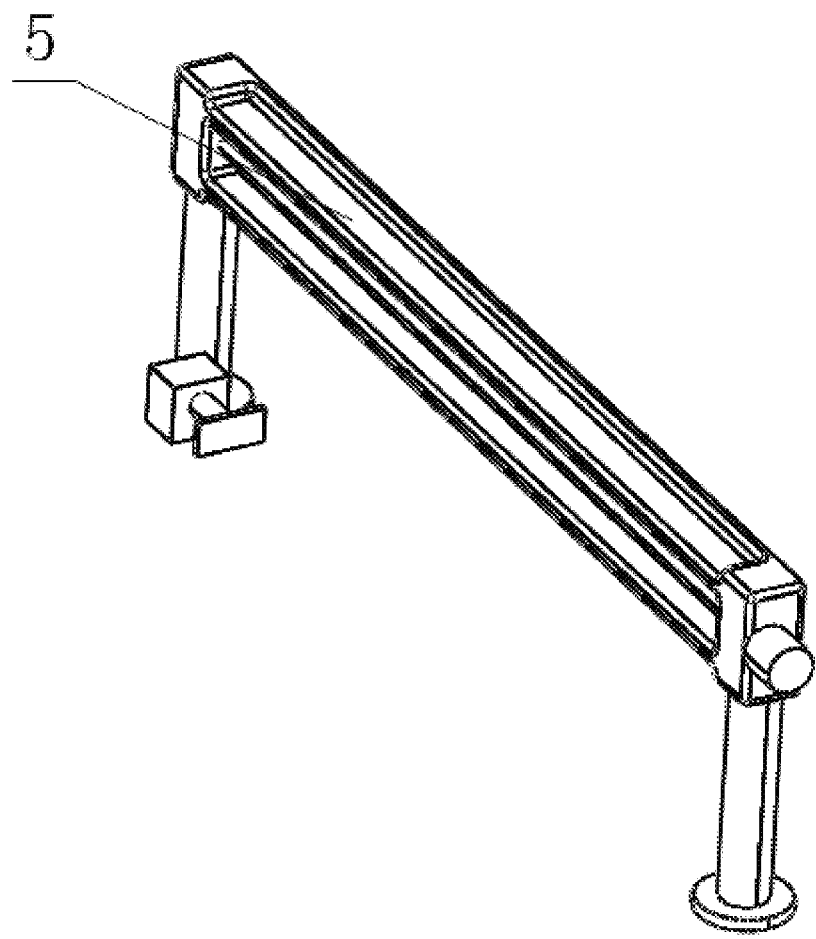
Figure 1D:
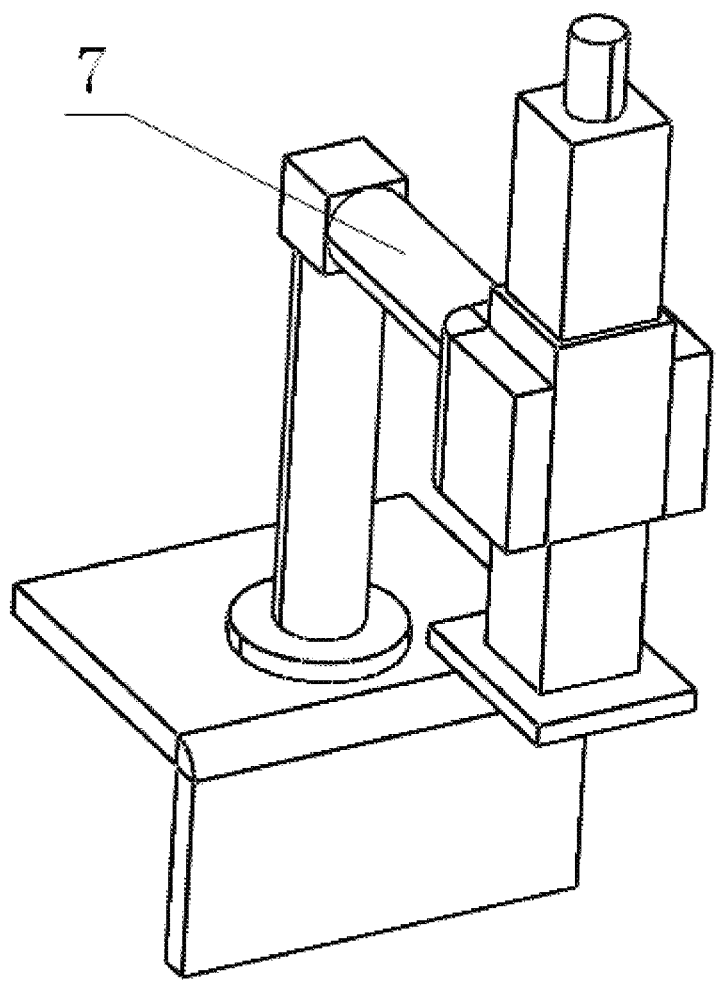

In the diagrams: 1: manipulator, 2: 96-deep-well plate, 3: 96-shallow-well plate, 4: conveyor belt with fixed fixtures; 5: 2-DOF slipway; 6: 96-channal pipetting system; 7: coloring device; 8: the oscillating mixing device; 9: the microplate reader; 10: shallow-well plate recycling platform; 11: 96-pipetting head container; 12: fixed fixtures; 13: first motor; 14: second motor; 15: the first connecting rod; 16: the second connecting rod; 17: third connecting rod; 18: the first fixture block; 19: the first screw; 20: slider; 21: groove; 22: vertical slipway; 23: the fourth connecting rod; 24: the fifth connecting rod; 25: the second fixture block; 26: clamping device; 27: plate loading platform; 28: second plate recycling platform; 29: pipette head container recycling platform.

DETAILED DESCRIPTION OF EMBODIMENTS

Embodiment 1

As illustrated in FIGS. 1A-1D, the production-line-type high-throughput screening system comprised of the manipulator 1, the well plate loading platform, the conveyor belt 4 with fixed slots, the 2-DOF slipway 5, the coloring device 7, the oscillating mixing device 8, the microplate reader 9, the pipette head container recycling platform, the deep-well plate recycling platform and the shallow-well plate recycling platform 10. Wherein said conveyor belts with fixed slots included three parallel belts, the first conveyor belt for conveying pipette head container, the second belt conveyor for conveying 96-deep-well plate, the third conveyor belt for conveying 96-shallow-well plate, respectively. Wherein said 2-DOF slipway 5 stretched across the three parallel belts, 96-channal pipetting system 6 was mounted on the 2-DOF slipway. Along the moving direction of the sample on the third conveyor belt, the coloring device 7, the oscillating mixing device 8 and the microplate reader 9 were arranged sequentially. Specifically, wherein said the coloring device 7 was a 96-channel pipette system, which was set on one side of the third conveyor belt to add developer to the 96-shallow-well plate which had already loaded samples. In one embodiment of the present invention, there were four manipulators. The first manipulator was used to carry the 96-shallow-well plate, the 96-deep-well plate and the pipette head container from the well plate loading platform to the corresponding conveyor belt. The second manipulator was used to carry the 96-shallow-well plate from the microplate reader 9 to the shallow-well recycling platform 10. The third manipulator was used to carry the 96-deep-well plate and the empty pipette head container to the deep-well recycling platform and pipette head container recycling platform. The fourth manipulator was used to carry the 96-shallow-well plate from the conveyor belt to the oscillating mixing device 8.

Figure 2:
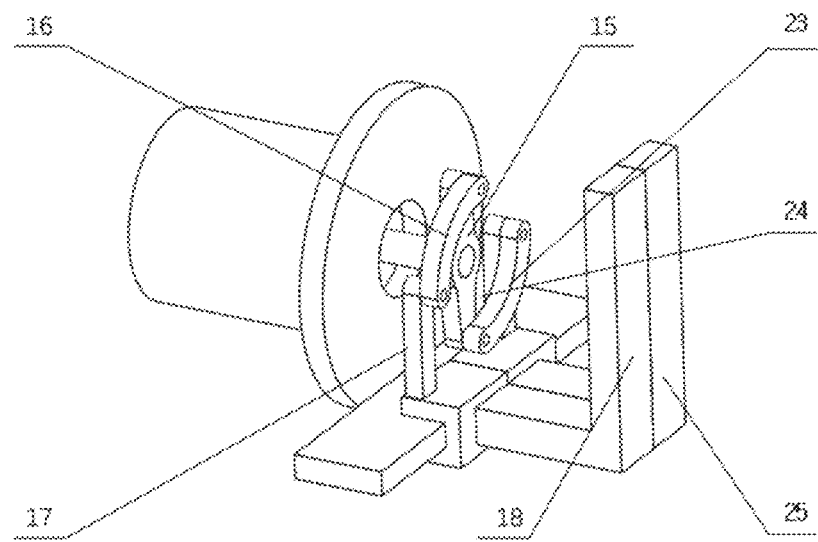
FIG. 2 is a diagram illustrating the clamping device at the end of the manipulator in a preferred embodiment.
Figure 3:
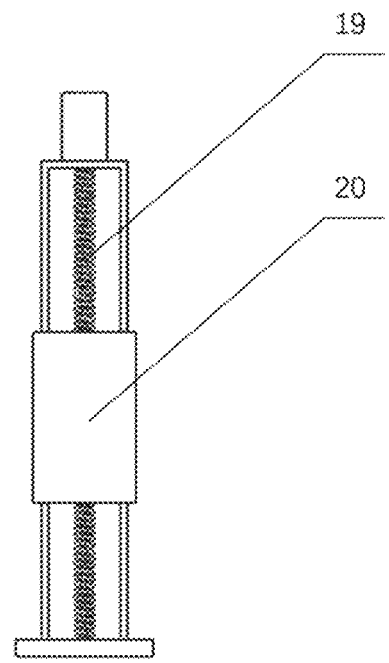
FIG. 3 is a diagram illustrating the slipway of the 2-DOF slipway 5 and the coloring device 7.
Figure 4:
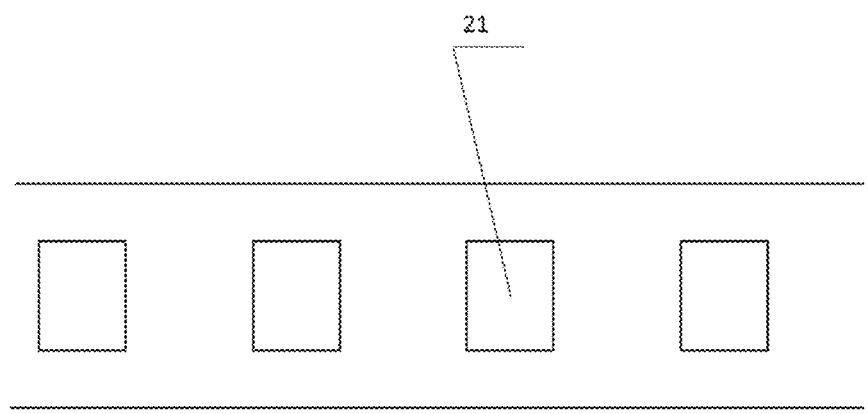
FIG. 4 is a diagram illustrating conveyor belt with fixed slots.

As illustrated in FIG. 2, the end of the manipulator was equipped with clamping device for holding the 96-well plate or the pipette head container. The first connecting rod 15 of the clamping device was driven directly by the motor, and its ends were connected with the second connecting rod 16 and the fourth connecting rod 23 respectively by pin; and it was rotatable along the connecting part; the second connecting rod 16 was connected with the third connecting rod 17 by a pin and was rotatable along the connecting part; the fourth connecting rod 23 was connected with the fifth connecting rod 24 by a pin and was rotatable along the connecting part; the third connecting rod 17 and the fifth connecting rod 24 were respectively connected fixedly with the first chuck 18 and the second chunk 25. When the motor drived the first connecting rod 15 to rotate, the first connecting rod 15 drived the second connecting rod 16, the third connecting rod 17, the fourth connecting rod 23 and the fifth connecting rod 24 to rotate. The first chuck 18 and the second chuck 25 moved relatively at the horizontal. The first chuck 18 and the second chuck 25 loosed the 96-well plate or pipette head container when motor was turning, the first chuck 18 and the second chuck 25 clamped the 96-well plate or pipette head container when motor was reversing.

There were fixed fixtures 12 installed on both sides of every conveyor belt under the 2-DOF slipway. When the pipette head container, the 96-deep-well plate and the 96-shallow-well plate were moved to the corresponding position, the fixed fixtures 12 were driven by the pneumatic device to move relatively and clamp 96-well plate or pipette head container, the three conveyor belts stopped moving at the same time. The rectangular grooves on the conveyor belt could make it more convenient and accurate for pipetting with the cooperation of the fixed fixtures.

After taking a pipette head from the pipette head container, the 96-channel pipette system 6 was removed to the 96-deep-well plate for extraction. Then the 96-channel pipette 6 was moved to the top of the 96-shallow-well plate to drain the liquid from the pipette head to 96-shallow-well plate to complete the pipetting. After draining the liquid, the 96-channel pipette system 6 was moved above the pipette head container, and discharged the used pipette head to the pipette head container. The 96-deep-well plate and the pipette head container which had been drawn were pushed forward by the conveyor belt. The 96-shallow-well plate with liquid was conveyed to the coloring device 7. The developer was added from the 96-channel pipette system to the 96-shallow-well plate then the 96-shallow-well plate was carried to the oscillating mixing device 8 by the manipulator. The 96-shallow-well plate was oscillated by the oscillating mixing device 8 for some time and kept warm, then was sent to the microplate reader 9. After being inspected, the 96-shallow-well plate was transported by the manipulator to the shallow-well recycling platform 10. The oscillating mixing device 8 was not in contact with the conveyor belt and fixed above the conveyor belt. When the 96-shallow-well plate was close to the oscillation mixing device 8, the conveyor belt stopped. Then the 96-shallow-well plate was transported to the working position of the oscillation mixing device 8 by the manipulator. After the transport completed, the conveyor belt started moving, and the 96-shallow-well plate was carried to the conveyor belt by the manipulator and transported to the microplate reader 9. The microplate reader 9 was not in contact with the conveyor belt but suspended above it. When the 96-well plate passed, it would be tested by the microplate reader 9. The microplate reader 9 can be used as the Cytation 3 cell imaging multifunctional detection system (with a system integrated automatic digital microscope and/or microplate detector, which based on high-performance detection of optical path of light filter and highly flexible detection of optical path of raster) from BioTek Instruments Co., Ltd. in US. The oscillating mixing device 8 can be used as the ST60-4 microplate thermostat oscillator in Hangzhou Miou Instruments Co., Ltd.(using the microplate incubator comprised by the micro-processing technology and PID control mode, with which the upper and lower microplate can be heated, to make each well in the microplate can be heated evenly).

The conveyor belt which was used to transport the 96-shallow-well plate had a long working time. On the contrary, the other two conveyor belts had a short working time. Therefore, when the conveyor belt used to transport the 96-shallow-well plate was working, the drive motors of the two other conveyor belts would stop at a specific working position to ensure that the three conveyor belts work synchronously.

The manipulator was equipped with a visual sensor for automatically capturing the well plate on conveyor belts.

The production-line-type high-throughput screening system was equipped with sensors at every working position, used for detecting the presence and departure of the well plate or the pipette head container.

The first motor 13 and the second motor 14 were both equipped with coding sensors. The 2-DOF slipway was equipped with a collision sensor, and the clamping device at the end of manipulator was equipped with a pressure sensor.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A production-line-type high-throughput screening system, comprising:
    one or more manipulators each comprising a clamping device configured to carry a 96-well plate,
    conveyor belts with one or more fixed slots located thereon, wherein each slot accommodates a 96-well plate or a pipette head container,
    a 2-DOF slipway,
    fixed fixtures installed on both sides of every conveyor belt and configured to clamp the 96-well plate in the fixed slots, wherein the fixed fixtures are pneumatically actuated when the conveyor belts are moved to a position in which the fixed slots are aligned,
    a multi-channel pipette configured to be mounted on the 2-DOF slipway and to fill a 96-well plate,
    a coloring device, wherein the coloring device is a 96-channel pipette system comprising developer and configured to add developer to a 96-well plate,
    an oscillating mixing device, and
    a microplate reader.

2. The screening system of claim 1, wherein said screening system further comprises:
    a 96-well plate loading platform,
    a pipette head container recycling platform, and
    a first plate recycling platform that accommodates a first 96-well plate, and
    a second plate recycling platform that accommodates a second 96-well plate;
    wherein said conveyor belts with one or more fixed slots comprise three parallel belts, wherein the three parallel belts comprise:
    a first conveyor belt for conveying the pipette head container,
    a second conveyor belt for conveying the first 96-well plate, and
    a third conveyor belt for conveying the the second 96-well plate,
    wherein the one or more manipulators are four manipulators,
    wherein the first 96-well plate and the second 96-well plate each comprise 96 uniform wells, and wherein each of the uniform wells of the first 96-well plate hold more liquid than each of the uniform wells of the second 96-well plate,
    wherein the 2-DOF slipway stretches across the three parallel belts, and
    wherein the multi-channel pipette is configured to be mounted on the 2-DOF slipway, and
    wherein the coloring device, the oscillating mixing device, and the microplate reader are arranged sequentially along a moving direction of a sample on the third conveyor belt, with the sample reaching the coloring device first, followed by the oscillating mixing device, and then the microplate reader.

3. The screening system of claim 2, wherein:
    the four manipulators comprise a first manipulator, a second manipulator, a third manipulator, and a fourth manipulator;
    the first manipulator is configured to carry the first 96-well plate and the pipette head container from the 96-well plate loading platform to the corresponding conveyor belt;
    the second manipulator is configured to carry the 96-well plate from the microplate reader to the 96-well recycling platform;
    the third manipulator is configured to carry the 96-well plate and the pipette head container to the 96-well recycling platform and the pipette head container recycling platform; and
    the fourth manipulator is configured to carry the 96-well plate from the conveyor belt to the oscillating mixing device.

4. The system of claim 1, wherein the conveyor belts with the fixed slots comprise uniformly-spaced grooves for placing a 96-well plate and the pipette head container.

5. The system of claim 1, wherein the coloring device is a 96-channel pipette system, which is set on one side of the third conveyor belt, and is configured to add developer to the 96-shallow-well plate which is configured to contain loaded samples.

6. The system of claim 1, further comprising a clamping device; wherein a clamping device is equipped at an end of the manipulator, for holding the 96-well plate or pipette head container; wherein a first connecting rod of the clamping device is configured to be driven directly by a motor, and its ends are configured to be connected with a second connecting rod and a fourth connecting rod respectively by a pin, and it is rotatable along its connecting part; wherein the second connecting rod is configured to be connected with a third connecting rod by a pin and is rotatable along its connecting part; wherein a fourth connecting rod is configured to be connected with a fifth connecting rod by a pin, and is rotatable along its connecting part; wherein the third connecting rod and the fifth connecting rod are respectively connected fixedly with a first chuck and a second chunk.

7. The system of claim 1, further comprising fixed fixtures installed on both sides of every conveyor belt under the 2-DOF slipway.

8. The system of claim 1, wherein the manipulator is equipped with a visual sensor.

9. The system of claim 1, wherein said system is equipped with sensors at every working position.

10. The system of claim 6, wherein the 2-DOF slipway is equipped with a collision sensor, and the clamping device at the end of manipulator is equipped with a pressure sensor.

* * * * *